United States Patent
Hung

(10) Patent No.: US 8,532,996 B2
(45) Date of Patent: Sep. 10, 2013

(54) AUDIBLE POST-IT SYSTEM

(75) Inventor: Ching-Fu Hung, Hsinchu (TW)

(73) Assignee: GeneralPlus Technology, Inc., Hsinchu (TW)

( * ) Notice: Subject to any disclaimer, the term of this patent is extended or adjusted under 35 U.S.C. 154(b) by 332 days.

(21) Appl. No.: 12/926,017

(22) Filed: Oct. 21, 2010

(65) Prior Publication Data
US 2012/0004917 A1    Jan. 5, 2012

(30) Foreign Application Priority Data
Jul. 2, 2010 (TW) .................................. 99121882 A

(51) Int. Cl.
*G10L 21/00*    (2013.01)
(52) U.S. Cl.
USPC ................. 704/272; 704/270; 704/2; 704/10; 704/278
(58) Field of Classification Search
USPC ................. 704/272, 2, 10, 270, 278
See application file for complete search history.

(56) References Cited

U.S. PATENT DOCUMENTS

| | | | | |
|---|---|---|---|---|
| 5,527,407 A | * | 6/1996 | Gartland et al. | 156/64 |
| 7,333,768 B1 | * | 2/2008 | Coltman et al. | 434/317 |
| 7,485,794 B2 | * | 2/2009 | Koizumi | 84/601 |
| 2002/0196979 A1 | * | 12/2002 | Yen et al. | 382/190 |
| 2004/0125413 A1 | * | 7/2004 | Cordery | 358/3.28 |

* cited by examiner

*Primary Examiner* — Qi Han
(74) *Attorney, Agent, or Firm* — Bacon & Thomas, PLLC

(57) ABSTRACT

An audible post-it system includes a post-it note printed with an index and an optical reading and recording device having an optical module, a switch, a storage device, an audio recording device, an audio playing device and a processor. The optical reading and recording device reads an image of the index. When the optical reading and recording device is at a recoding state, the processor receives the image of the index and obtains the index, then receives a digital audio outputted by the audio recording device to match the index with the digital audio, and stores the digital audio based on the index. When the optical reading and recording device is at a playing state, the processor receives the image of an index and retrieves the index, then reads a digital audio based on the index, and sends the digital audio to the audio playing device for playing.

15 Claims, 3 Drawing Sheets

AUDIBLE POST-IT SYSTEM

BACKGROUND OF THE INVENTION

1. Field of the Invention

The present invention relates to a post-it system and, more particularly, to an audible post-it system.

2. Description of Related Art

Recently, parents pay close attention to their child or children since the number of children in a family are getting fewer and fewer. Also, the parents have spent much money on children related products such as children story books to thereby increase the reading power and form the reading habit.

In children's behaviors, a child typically does not know many words, and an adult accompanying him or her is required for speaking or reading the words in a children story book. Accordingly, the child can combine the words and pictures to increase the fun and the learning efficiency.

However, the modern parents mostly have little time to accompany their child or children due to the busy works or household affairs, so the child or children may loss the interest in learning as nobody can read it for them.

To overcome this, a typical technology uses a reading pen 120 as shown in FIG. 1 which schematically illustrates a typical audio book. In FIG. 1, a barcode 110 is printed on some page of a book, and a reading pen 120 is used to scan the barcode 110 to thereby find a corresponding voice data from an internal database and play it by an internal speaker. Accordingly, children can use the reading pen 120 to listen in to the content of a children story book.

However, such a technology cannot be applied to a children story book without the barcode. For example, many existing and famous children story books or picture books do not contain the barcode 110, so the reading pen 120 cannot create corresponding voice. In addition, the voice data is typically pre-recorded for the reading pen 120, so that the voice produced is different from the parents' voice and thus is not familiar to child or children, resulting in reducing the attraction for a little child.

Therefore, it is desirable to provide an improved audible post-it system to mitigate and/or obviate the aforementioned problems.

SUMMARY OF THE INVENTION

The object of the present invention is to provide an audible post-it system, which can change a typical children story book into an audio book, increase the value of an existing children story book, and allow the parents' voice to be listened by their child or children to thereby increase the attraction.

According to a feature of the invention, an audible post-it system is provided, which includes a post-it note and an optical reading and recording device. The post-it note is stuck on a surface of an object and printed with an index. The optical reading and recording device has an optical module, a switch, a storage device, an audio recording device, an audio playing device, and a processor. The optical module reads an image of the index which is printed on the post-it note. The switch switches the optical reading and recording device to be at a recording state or a playing state. The storage device temporarily stores data. The audio recording device receives a voice and converts the voice into a digital audio for storing it in the storage device. The audio playing device plays the digital audio stored in the storage device. The processor is connected to the optical module, the switch, the audio recording device, the audio playing device, and the storage device for controlling the operation thereof. When the optical reading and recording device is at the recoding state, the processor receives the image of the index and obtains the index, then receives the digital audio outputted by the audio recording device to thereby match the index with the digital audio, and finally stores the digital audio based on the index. When the optical reading and recording device is at the playing state, the processor receives the image of the index and retrieves the index, then reads the digital audio based on the index, and finally sends the digital audio to the audio playing device for playing.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
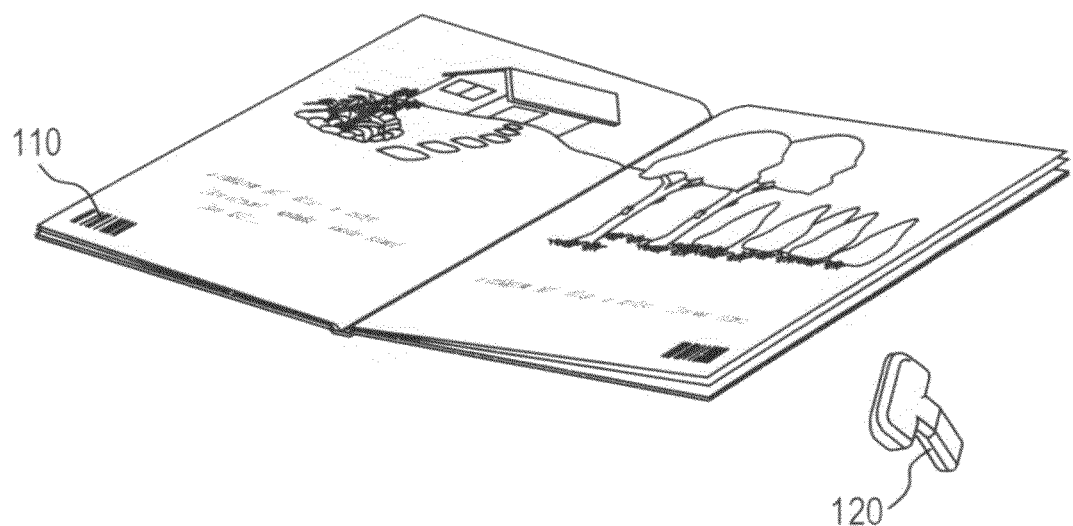
FIG. 1 is a schematic view of a typical audio book.
Figure 2:
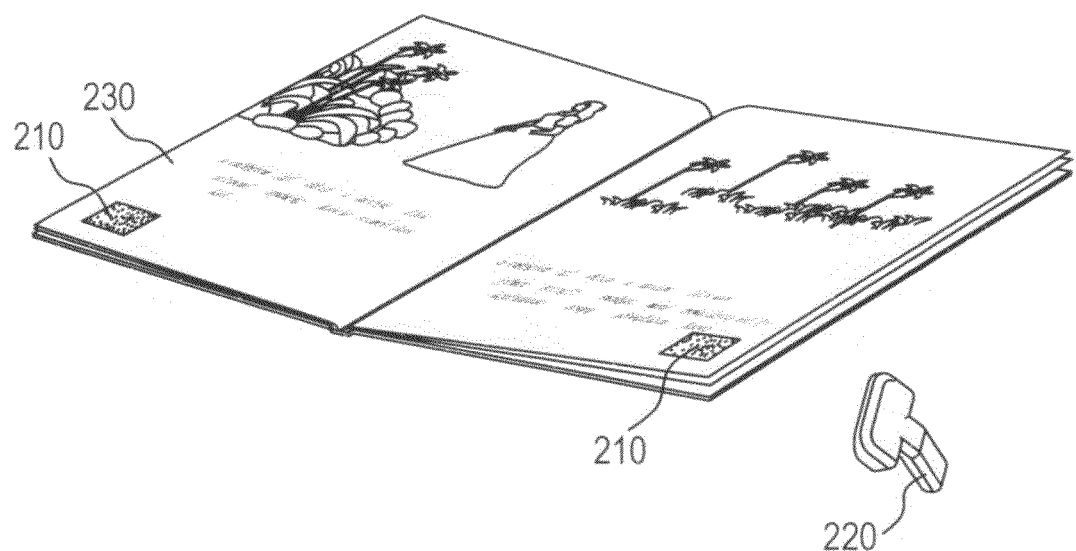
FIG. 2 is a schematic view of an audio book with an audible post-it system according to an embodiment of the invention.
Figure 3:
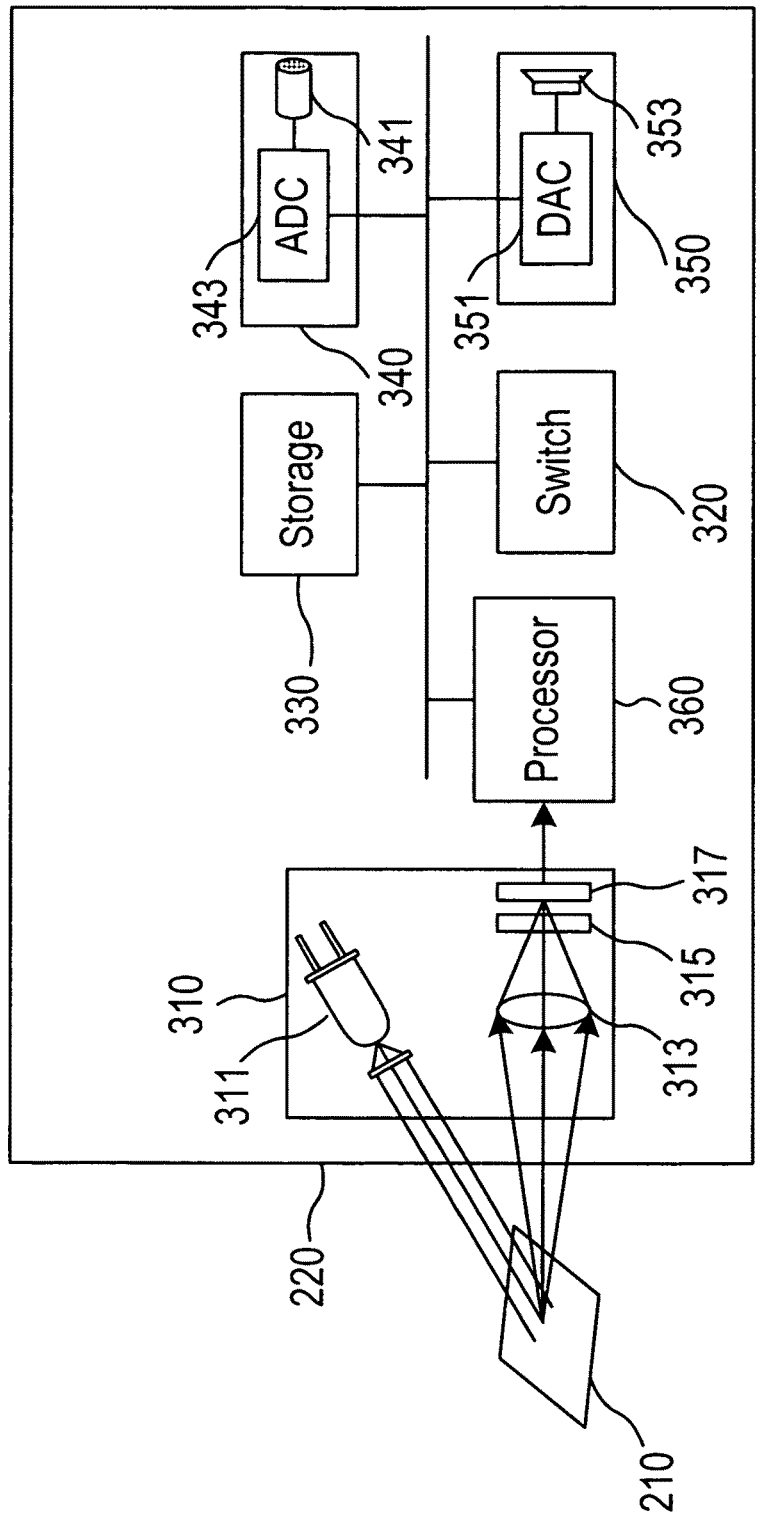
FIG. 3 is a block diagram of an optical reading and recording device according to an embodiment of the invention.

FIG. 2 is a schematic view of an audio book with an audible post-it system according to an embodiment of the invention. FIG. 3 is a block diagram of an optical reading and recording device according to an embodiment of the invention. As shown in FIGS. 2 and 3, the audible post-it system includes at least a post-it note 210 and an optical reading and recording device 220.

The post-it note 210 is used for being stuck on a surface of an object 230. The post-it note 210 is printed with at least one index. The index is different on each post-it note 210, and has a size of hundreds of microns (μm) that can be neglected by human eyes. Each post-it note 210 can have multiple indexes.

In this embodiment, the post-it notes 210 are stuck on different pages of a children story book, respectively. In other embodiment, the post-it notes 210 is sticky, can be stuck on anything, such as a refrigerator's door, a bulletin board, a calendar, a notebook, and/or a book.

The optical reading and recording device 220 has an optical module 310, a switch 320, a storage device 330, an audio recording device 340, an audio playing device 350, and a processor 360.

The optical module 310 reads an image of an index on the post-it note 210. The optical module 310 includes a light source 311, a lens 313, a filter 315, and a sensor 317.

The light source 311 generates a light of specific wavelength, such as an infrared or ultraviolet, to illuminate the post-it note 210. The lens 313 allows the light reflected from or scattered from the post-it note 210 to pass through. The filter 315 filters out unwanted rays and only allows the light of specific wavelength to pass through, thereby obtaining light image corresponding to the index of the post-it note. The sensor 317 is coupled to the filter 315 in order to sense the light passing through the filter 315 so as to form the image of the index.

The index printed on the post-it note 310 is formed of a readable material by the optical module 310, referring to as an optical module readable material, which can be a match of carbonaceous ink and infrared or invisible ink and ultraviolet. The optical module readable material has the optical feature of absorbing an invisible light of specific wavelength. The optical module readable material can be an invisible ink which has the optical feature of absorbing an invisible ultraviolet light. The optical module readable material can be a carbon-contained black ink which can absorb an infrared. Namely, the optical module readable material has the optical feature of absorbing an invisible infrared light.

When light of specific wavelength illuminates, the index can absorb the light of specific wavelength due to the readable material, and the sensor 317 thus senses a dark spot at the position of the index. The filter 315 allows the light of specific wavelength to pass through, so that light reflected from the position without the index is obtained.

The switch 320 switches the optical reading and recording device 220 to be at a recording state or a playing state. The switch 320 is preset to the playing state for the optical reading and recording device 220. When the parents want to record their voice data, the switch 320 is tuned to put the optical reading and recording device 220 at the recording state.

The storage device 330 is provided for temporarily storing data. The storage device 330 includes a SRAM and a flash. The SRAM can temporarily store variables and codes required when the processor 360 executes a program. The flash can store the program executed by the processor 360, or record the desired audio data.

The audio recording device 340 receives a voice and converts the voice into a digital audio for storing it in the storage device 330. The audio recording device 340 includes a microphone 341 and an analog to digital converter (ADC) 343.

The microphone 341 receives the voice and converts it into an analog voice signal. The ADC 343 is connected to the microphone 341 in order to convert the analog voice signal into the digital audio.

The audio playing device 350 plays the digital audio stored in the storage device 330. The audio playing device 350 includes a digital to analog converter (DAC) 351 and a speaker 353.

The DAC 351 is connected to the processor 360 in order to convert the digital audio into an analog sound playing signal. The speaker 353 is connected to the DAC 351 in order to receive the analog sound playing signal for playing.

The processor 360 is connected to the optical module 310, the switch 320, the audio recording device 340, the audio playing device 350, and the storage device 320 for controlling the operation thereof. When the optical reading and recording device 220 is at the recoding state, the processor 360 obtains the index based on the image of the index, and stores the digital audio in the storage device 330 to thereby match the index with the digital audio. When the optical reading and recording device 220 is at the playing state, the processor 360 retrieves the index based on the image of the index read by the optical module 310, and retrieves the digital audio from the storage device 330 based on the index for playing by the audio playing device 350.

Figure 4:
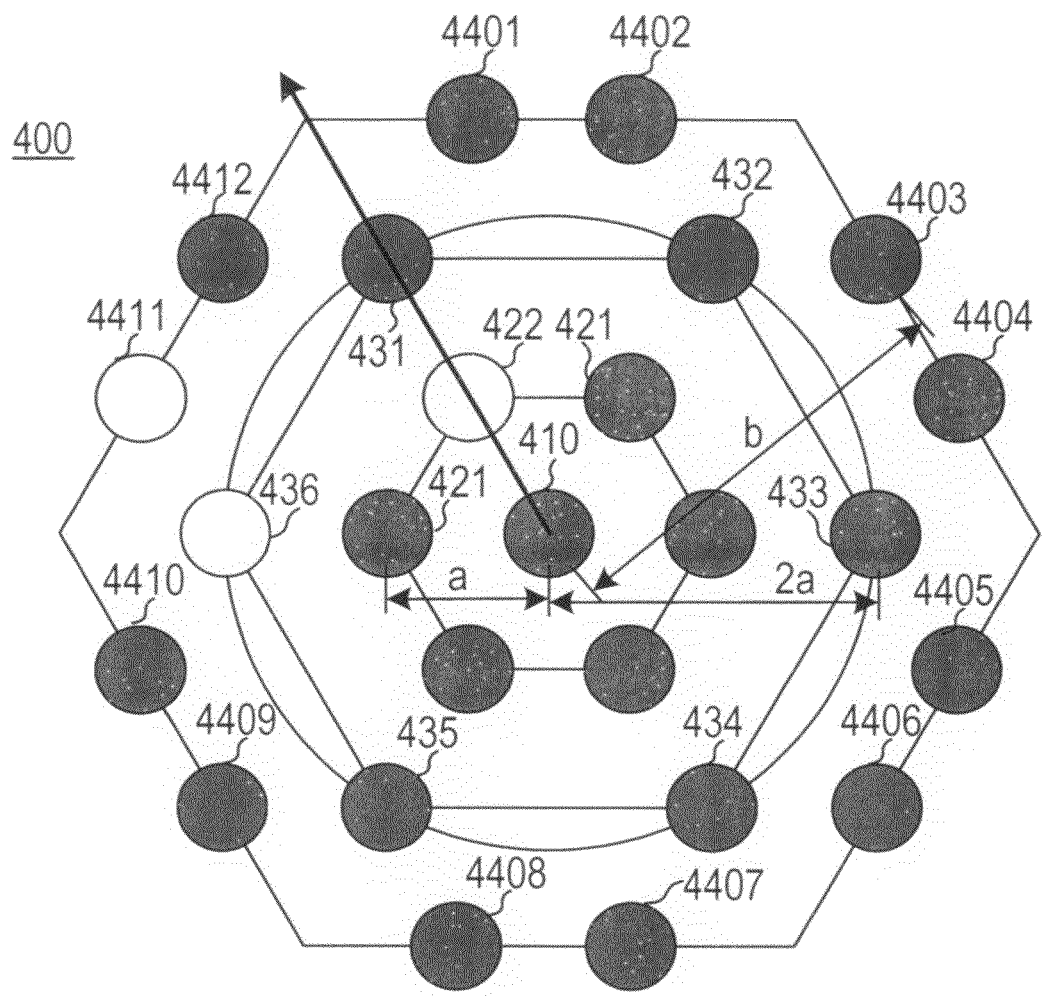
FIG. 4 is a schematic view of an index according to an embodiment of the invention.

FIG. 4 is a schematic view of an index according to an embodiment of the invention. The index 400 contains multiple point sub-indexes, which are disposed in an isotropic arrangement. These point sub-indexes are so tiny that can be neglected by human eyes.

As shown in FIG. 4, each of the point sub-indexes in an isotropic arrangement has a radius of about 100 µm. The point sub-indexes include a center point sub-index 410, multiple direction point sub-indexes 421, 422, multiple first data point sub-indexes 431-436, and multiple second data point sub-indexes 4401-4412. In this embodiment, each index 400 has six direction point sub-indexes 421, 422 around the center point sub-index 410 at a first distance (a). The direction point sub-indexes 421, 422 function as a direction indicator. The first distance (a) is about 400 µm. A recognizable direction point sub-index 422 of the direction point sub-indexes links the center point sub-index 410 to indicate the direction at the index 400. The recognizable direction point sub-index 422 can be a hollow dot or blank dot, wherein a blank dot means no dot being printed.

As shown in FIG. 4, the index 400 also has six first data point sub-indexes 431-436 around the center point sub-index 410 at a second distance (2a). The first data point sub-indexes 431-436 function as a first data indicator. The second distance (2a) is double of the first distance (a). Each of the first data point sub-indexes 431-436 can be a blank dot to indicate '0' in binary representation, or a solid dot to indicate '1' in binary representation. Since the direction at the index 400 is shown by linking the center point sub-index 410 with the recognizable direction point sub-index 422, the first data indicator can be arranged in a clockwise direction, and starts with the first data point sub-index on the link. Namely, in this case, the point sub-index 431 is a most significant bit (MSB), and the first data indicator is representative of $1\ 1\ 1\ 1\ 1\ 0_b$. Instead, the first data indicator can be arranged in a counterclockwise direction, and in this case the point sub-index 431 is a least significant bit (LSB), so the first data indicator is representative of $0\ 1\ 1\ 1\ 1\ 1_b$.

As shown in FIG. 4, the index 400 has twelve second data point sub-indexes 4401-4412 around the center point sub-index 410 at a third distance (b). The second data point sub-indexes 4401-4412 function as a second data indicator. The third distance (b) is greater than the second distance (2a). Each of the second data point sub-indexes 4401-4412 can be a blank dot to indicate '0' in binary representation, or a solid dot to indicate '1' in binary representation. Since the direction at the index 400 is shown by linking the center point sub-index 410 with the recognizable direction point sub-index 422, the second data indicator can be arranged in a clockwise direction. Namely, in this case, the point sub-index 4401 is a most significant bit (MSB), and the second data indicator is representative of $1\ 1\ 1\ 1\ 1\ 1\ 1\ 1\ 1\ 1\ 0\ 1_b$.

The optical reading and recording device 220 is preset to the playing state. When the parents want to record their voice data, the switch 320 is tuned to put the optical reading and recording device 220 at the recording state.

Next, the optical module 310 of the optical reading and recording device 220 illuminates the post-it note 210 to read the image of the index 400 on the post-it note 210. The processor 360 is based on the image of the index 400 to obtain the index 400, receives the digital audio previously generated by the audio recording device 340, and stores the digital audio in the storage device 330 to thereby match the index 400 with the digital audio.

When the index 400 is in an arrangement as shown in FIG. 4, the processor 360 can obtain the first data indicator representative of $0\ 1\ 1\ 1\ 1\ 1_b$ and the second data indicator representative of $1\ 1\ 1\ 1\ 1\ 1\ 1\ 1\ 1\ 1\ 0\ 1_b$ for the index 400. Accordingly, the processor 360 combines the two indicators into a 18-bit data, i.e., $1777D_H$ ($0\ 1\ 1\ 1\ 1\ 1\ 1\ 1\ 1\ 1\ 1\ 1\ 1\ 1\ 1\ 1\ 1\ 0_b$), to indicate the stored position of the digital audio in the storage device 320.

In other embodiments, the first and the second data indicators can be applied to a hash function to thereby obtain the stored position of the digital audio in the storage device 320.

After the digital audio is recorded, the parents can turn the switch 320 to put the optical reading and recording device 220 at the playing state.

When the children use the optical reading and recording device 220 to touch the post-it note 210, the processor 360 is based on the image of the index 400 read by the optical module 310 to retrieve the index 400, and based on the index 400 to retrieve the digital audio from the storage device 330 for sending it to the audio playing device 350 as an output to thereby achieve the interactive effect.

Since the indexes recorded in every post-it note 210 are different, it indicates that all digital audios recorded are stored in different positions, and each of the post-it notes 210 is matched with a different digital audio.

The audible post-it system can be applied to a bulletin board, white board, or another place. For example, parents can record their words in the optical reading and recording device 220, and put a corresponding post-it note 210 on a bulletin board, a white board, or a refrigerator's door. When the children come home, they can use the optical reading and recording device 220 to retrieve the index on the post-it note 210 to thereby listen to the recorded words. Accordingly, the utility of post-it note can be extended.

The audible post-it system can be applied to a personal calendar. For example, a user can paste a post-it note 210 on a certain location of the personal calendar, and record a digital audio associated with the current schedule. When the user uses the optical reading and recording device 220 to retrieve the index, the digital audio associated with the current schedule can be heard.

The audible post-it system can be applied for learning books. For example, an instructor pastes a post-it note 210 on a certain location of a book, and records a digital audio associated with the comment or statement of the context of the book on the certain location. When a learner uses the optical reading and recording device 220 to retrieve the index, the digital audio associated with the comment or statement of the context of the book on the certain location can be heard. Therefore, the interactive and learning effect is relatively increased.

In other embodiments, when parents want to record their voice data, they can turn the switch 320 to put the optical reading and recording device 220 at the recording state to record, and the processor 360 stores the digital audio generated by the audio recording device 340 in the storage device 330, so the optical module 310 of the optical reading and recording device 220 can focus on the post-it note 210 to thereby read the image of the index 400 on the post-it note 210. The processor 360 is based on the image of the index 400 to obtain the index 400, and matches the index 400 with the digital audio.

As cited, the audible post-it system can change a non-audio book into an audio book so as to add the usage value on books. In addition, children can hear their familiar parents' voice to thereby increase the attraction and learning effect on the children.

Although the present invention has been explained in relation to its preferred embodiment, it is to be understood that many other possible modifications and variations can be made without departing from the spirit and scope of the invention as hereinafter claimed.

What is claimed is:

1. An audible post-it system, comprising:
   a post-it note printed with an index for being stuck on a surface of an object, the index being formed of a specific optical module readable material, wherein the index comprises a plurality of point sub-indexes in an isotropic arrangement; and
   an optical reading and recording device including:
   an optical module for reading an image of the index on the post-it note;
   a switch for switching the optical reading and recording device to be at a recording state or a playing state;
   a storage device for temporarily storing data;
   an audio recording device for receiving a voice and converting the voice into a digital audio for being stored in the storage device;
   an audio playing device for outputting and playing the digital audio stored in the storage device; and
   a processor for retrieving the index based on the image of the index;
   wherein, when the optical reading and recording device is at the recoding state, the optical module reads the image of the index printed on the post-it note, and the processor obtains the index according to the image of the index, and matches the index with the digital audio; and when the optical reading and recording device is at the playing state, the optical module reads the image of the index printed on the post-it note, and the processor retrieves the index according to the image of the index and further obtains the digital audio matched with the index so as to send the digital audio to the audio playing device for playing.

2. The audio post-it system as claimed in claim 1, wherein the optical module comprises:
   a light source for providing a light with a specific wavelength to illuminate the post-it note;
   a lens for allowing light reflected or scattered from the post-it note to pass through;
   a filter for allowing the light with the specific wavelength to pass through thereby obtaining light corresponding to the index printed on the post-it note; and
   a sensor coupled to the filter for sensing the light passing through the filter so as to form the image of the index.

3. The audio post-it system as claimed in claim 2, wherein the audio recording device comprises:
   a microphone for receiving the voice and converting the voice into an analog voice signal; and
   an analog to digital converter (ADC) connected to the microphone for converting the analog voice signal into the digital audio.

4. The audio post-it system as claimed in claim 3, wherein the audio playing device comprises:
   a digital to analog converter (DAC) connected to the processor for converting the digital audio into an analog sound playing signal; and
   a speaker connected to the DAC for receiving the analog sound playing signal for playing.

5. The audio post-it system as claimed in claim 4, wherein the point sub-indexes comprises:
   a center point sub-index located at a center of the point sub-indexes;
   a plurality of direction point sub-indexes located around the center point sub-index at a first distance, wherein the direction point sub-indexes have a recognizable direction point sub-index for linking to the center point sub-index to form a direction at the point index; and
   a plurality of first data point sub-indexes located around the center point sub-index at a second distance which is greater than the first distance.

6. The audio post-it system as claimed in claim 5, wherein the point sub-indexes further comprise a plurality of second data point sub-indexes located around the center point sub-index at a third distance which is greater than the second distance.

7. The audio post-it system as claimed in claim 6, wherein the second distance is double of the first distance.

8. The audio post-it system as claimed in claim 1, wherein the specific optical module readable material is carbonaceous ink.

9. The audio post-it system as claimed in claim 8, wherein the carbonaceous ink has an optical feature of absorbing an invisible infrared light.

10. The audio post-it system as claimed in claim 1, wherein the point sub-indexes are made tiny and invisible to human eyes.

11. The audio post-it system as claimed in claim 10, wherein the object is a tale book.

12. The audio post-it system as claimed in claim 10, wherein the object is a personal calendar.

13. The audio post-it system as claimed in claim 10, wherein the object is a notebook.

14. The audio post-it system as claimed in claim 1, wherein the specific optical module readable material is an invisible ink.

15. The audio post-it system as claimed in claim 14, wherein the invisible ink has an optical feature of absorbing an invisible ultraviolet light.

\* \* \* \* \*